United States Patent
Dassot et al.

(10) Patent No.: US 6,539,327 B1
(45) Date of Patent: Mar. 25, 2003

(54) PROCESS FOR DETERMINING THE POSITION OF A MOVING OBJECT USING MAGNETIC GRADIENTMETRIC MEASUREMENTS

(75) Inventors: Gilles Dassot, Biot (FR); Roland Blanpain, Entre Deux Guiers (FR); Bruno Flament, Voiron (FR); Claude Jauffret, Le Pradet (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/508,482

(22) PCT Filed: Sep. 10, 1998

(86) PCT No.: PCT/FR98/01940
§ 371 (c)(1),
(2), (4) Date: Jun. 26, 2000

(87) PCT Pub. No.: WO99/13358
PCT Pub. Date: Mar. 18, 1999

(30) Foreign Application Priority Data

Sep. 11, 1997 (FR) .............................................. 97 11311

(51) Int. Cl.$^7$ .............................................. G01S 17/06
(52) U.S. Cl. ...................................... 702/150; 702/152
(58) Field of Search ....................... 324/207.11; 700/89; 701/207; 702/150, 152

(56) References Cited

U.S. PATENT DOCUMENTS

| | | | | |
|---|---|---|---|---|
| 4,672,562 A | * | 6/1987 | Egli et al. ................... | 364/559 |
| 4,672,564 A | * | 6/1987 | Egli et al. ................... | 364/559 |
| 5,038,103 A | * | 8/1991 | Scarzello et al. ........... | 324/244 |
| 5,239,474 A | * | 8/1993 | Eaton, Jr. et al. ........... | 364/449 |
| 5,258,709 A | * | 11/1993 | Laukien ...................... | 324/300 |
| 5,264,793 A | * | 11/1993 | Lo et al. ................ | 324/207.13 |
| 5,357,437 A | * | 10/1994 | Polvani ...................... | 364/449 |
| 5,374,933 A | * | 12/1994 | Kao ............................. | 342/357 |
| 5,387,863 A | * | 2/1995 | Lo et al. ................. | 324/207.13 |
| 5,444,669 A | * | 8/1995 | Polvani ........................ | 367/96 |
| 5,511,008 A | * | 4/1996 | Flament et al. ............. | 364/572 |
| 5,558,091 A | * | 9/1996 | Acker et al. ............. | 128/653.1 |
| 5,642,045 A | * | 6/1997 | Keefe et al. ................. | 324/244 |

(List continued on next page.)

FOREIGN PATENT DOCUMENTS

| FR | 2670300 | 12/1991 |
|---|---|---|
| GB | 2310931 | 9/1997 |

OTHER PUBLICATIONS

Wynn, W M; "Magnetic Dipole localization With A Gradiometer Obtaining Unique Solutions", IEEE International; vol. 4; pp. 1483–1485; 1997.*

Le Cadre, J P; "Properties And Performance Of Extended Target Motion Analysis"; IEEE Transactions on Aerospace and Electronic Systems; vol. 32; Issue 1996; pp. 66–83.*

Optimum Detection of Magnetic Dipoles; Yarotskii et al 2353 Measurement Techniques; 35 (1992) Oct., No. 10, New York; pp. 1190–1194.

*Primary Examiner*—John S. Hilten
*Assistant Examiner*—Douglas N Washburn
(74) *Attorney, Agent, or Firm*—Hayes Soloway P.C.

(57) ABSTRACT

A process for determining the position of a moving object, by the following steps: scalar measurements are acquired by a set of sensors all installed on the same site, at a position known at each instant; the trajectory of the object is determined approximately by a model; the measurements output from each sensor are combined to obtain spatial gradient measurements representative of the vector electromagnetic disturbance of the moving object; a vector of parameters characteristic of the model is estimated as a function of gradient measurements and as a function of the position of the sensors; and the position of the object is determined as a function of the position of the sensors and the parameters vector.

18 Claims, 8 Drawing Sheets

U.S. PATENT DOCUMENTS

| | | | | |
|---|---|---|---|---|
| 5,670,882 A | * | 9/1997 | Brandolino et al. | 324/345 |
| 5,684,396 A | * | 11/1997 | Aks et al. | 324/207.13 |
| 5,696,700 A | * | 12/1997 | O'Brien, Jr. et al. | 364/550 |
| 5,731,996 A | * | 3/1998 | Gilbert | 364/559 |
| 5,831,873 A | * | 11/1998 | Kohnen et al. | 364/559 |
| 5,850,625 A | * | 12/1998 | Maren et al. | 702/93 |
| 6,240,368 B1 | * | 5/2001 | Kreft | 701/214 |
| 6,253,154 B1 | * | 6/2001 | Oshizawa et al. | 701/221 |
| 6,269,324 B1 | * | 7/2001 | Rakijas et al. | 702/190 |
| 6,292,758 B1 | * | 9/2001 | Gilbert et al. | 702/150 |

\* cited by examiner

PROCESS FOR DETERMINING THE POSITION OF A MOVING OBJECT USING MAGNETIC GRADIENTMETRIC MEASUREMENTS

TECHNICAL FIELD

This invention relates to a process for determining the position of a moving object using magnetic gradientmetric measurements.

STATE OF THE ART

We will start by describing existing positioning/tracking methods based firstly on the use of electromagnetic measurements.

The Various Means of Measuring an Electromagnetic Field

If the quasi-static signature of the electromagnetic source is used, the useful pass band varies from a few kilohertz to $10^{-5}$ Hz. Document reference [1] at the end of the description contains an analysis of different means of measuring the electrical and magnetic field within this frequency band.

Vector Measurement Means

The electrical field E and the magnetic field B are intrinsically vector magnitudes. Directional systems capable of measuring each of the three components of the magnitude are frequently used in order to measure all information available in this type of signal.

For electrical measurements, a distinction is made firstly between the measurement of a potential difference between two electrodes. The electrical system must then have a large input impedance so that the measurement is not disturbed as described in document reference [2]. Another technique provides access to the electrical field in a conducting medium through a measurement of the electrical current passing between two electrodes, the contact impedances of the electrodes being perfectly adapted to the ambient medium; this is called the "current collection method" (see document reference [3]).

Vector magnetometers also measure vector components of the magnetic field in the directions of each of the magnetometer axes. For example there are "Fluxgate" magnetometers that are based on the principle of generating a compensation current to compensate the field to be measured in an iron core characterized by its hysteresis cycle, as described in document reference [4]. Another technique is based on a direct measurement of the magnetic flux in "Fluxmeter" bars, but this type of instrumentation is not well adapted to the measurement of magnetic fields at low frequencies. Finally, SQUID ("Superconducting Quantum Interference Device") magnetometers as described in document reference [5] are some of the most efficient devices since their resolution can be as high as $10^{-6}$ nT.Hz$^{-\frac{1}{2}}$ (the nanoTesla or nT being the most frequently used unit). Their superconducting technology requires an expensive cryogenic module that is difficult to use, and are usually used in gradientmetry due to their high precision; the difference between two nearby measurements is equivalent to a differentiation that automatically eliminates remote noise sources.

Scalar Magnetometers

One serious difficulty with magnetic field measurements is the presence of the earth's magnetic field that can be considered as constant in time for the scales considered, and that has an amplitude of 45000 nT in France. However it is not always possible to guarantee that there is no movement in the measurement direction, and it is very difficult to compensate for these displacements when they induce variations of the field with time within the useful frequency band. For example, a movement of 1 degree in a 45000 nT field generates 100 times more noise than the noise level of sensors in the zero to one Hertz band.

Scalar magnetometers overcome this difficulty by measuring the modulus of a total magnetic field, in other words the modulus of the vector sum of the earth's magnetic field (about 45000 nT in France) and the vector disturbance considered (a few nT). Nuclear magnetic resonance probes thus measure the precession frequency of protons or electrons (Larmor frequency) that is proportional to the modulus of the ambient field. The resolution can be as high as $10^{-3}$ nT.Hz$^{-\frac{1}{2}}$.

Given the relative disproportion between the modulus of the earth's field and the value of the disturbance due to the presence of the object, a good approximation as described in document reference [6] consists of assuming that the sensors measure the modulus of the earth's field plus the projection of the disturbance onto the earth field vector, as shown in FIG. 1. FIG. 1 illustrates the comparison between the vector sum of the earth's magnetic field $B_t$ and the measured magnetostatic disturbance $B_{signal}$, and the algebraic sum of the earth's magnetic field and the projection of the disturbance onto the earth's magnetic field vector. Scalar magnetometers measure $B_{total}$ and not $B_{signal}$. Assuming that a high pass filter was sued to eliminate the DC component and therefore the modulus of the earth's field, the scalar magnetic measurement is then written:

$$B_{scal} = B_{signal} \cdot U_t$$

One of the advantages of these devices, apart from the precisions achieved, is that there is no measurement direction, which makes them easier to use; probes may be placed in any mobile system, and are generally easier to deploy than vector systems.

However, document reference [7] emphasizes the degenerescence of the projection of an essentially vector magnitude (the disturbance) onto a constant vector (the earth's field). Therefore, this type of magnetometer is conventionally used in detection, but this type of sensor has never yet been used for positioning of sources from a single observation site.

Gradientmetric Devices for Measuring the Magnetic Field

Vector or scalar magnetic devices are used to make two types of measurements, firstly the field which is the basic technique since sensors usually provide uniform magnitudes in the magnetic field, and secondly the spatial gradient of the field.

For SQUID magnetometers, the gradient measurement consists of taking the difference between two spatially close measurements, which is intrinsically equivalent to a differentiation.

In practice, this technique eliminates the contribution of far sources that are usually sources of noise (earth's magnetic fields, geomagnetic noise, etc.). Thus, although equations for the decay in the amplitude of signals are degraded due to the differentiation ($1/r^4$ instead of $1/r^3$ for field measurements), the best reduction of disturbing noises can result in equivalent ranges (for example SQUIDs).

Note also that some positioning techniques are intrinsically based on gradient measurements, for example magneto-encephalography (MEG) techniques. This is also the case of this invention, and of the technique most resembling it discussed throughout the rest of this document.

One difficulty lies in adjusting the base length of the gradientmeter; this length can be fixed by carrying out a parametric study based on COR (Curves of the Operating Receptor) detection curves, that are a conventional tool according to detection theory, while respecting the assumption of a differential measurement; therefore, it is checked that the sensor spacing remains small compared with the distance from the source.

This latter constraint makes it possible to intrinsically talk about a "single observation site", even when several sensors are used to make the gradientmeters. In this case, it is assumed that the overall gradientmetric measurement device forms a single measurement site.

Use of Magnetostatic Indiscretions in Positioning

We will now consider magnetostatic positioning/tracking techniques using a single observation site.

Magnetostatic indiscretion of a ship or a vehicle is due to the ferromagnetic properties of the materials from which it is made, including the steel structure, metal plates, engines, propeller shafts, etc. This object type is modeled with good precision by a single magnetic dipole, as soon as the distance from the measurement system is a few times more than the largest dimension of the object.

The magnetic moment M of this object is then broken down into two parts:

A permanent magnetization that reflects the magnetic history of the object; it is a constant magnetization within a coordinate system related to the object, regardless of the direction of the ambient magnetic field.

An induced magnetization that is due to the magnetic susceptibility of the ferromagnetic materials. In the presence of an external magnetic excitation (in this case the earth's magnetic field) the elementary ferromagnetic dipoles are oriented along a common direction and produce a non-zero resultant.

In the case of a uniform movement along a straight line, the orientation of the object is constant within the earth's magnetic field, the spatial variability of which is negligible at the scales considered; therefore, the induced part of the magnetic moment does not vary with time or in space. Within the framework of this assumption about the displacement of the source, the total moment M of magnetic object is assumed to be constant in time and space.

The magnetostatic field of a ferromagnetic object appears as a disturbance in the earth's magnetic field. This disturbance is a vector disturbance and is written:

$$B = \frac{\mu_0 3u.u^T - I}{4\pi r^3} M$$

where r' denotes the vector of the relative position of the source with respect to the magnetometer, r denotes the modulus of r', u represents the elementary vector in this direction (u=r'/r) and I is the 3×3 identity matrix. Note that this expression is strongly non-linear for geometric parameters, although it is linear with respect to the magnetic moment.

In a conventional Cartesian coordinate system, this expression becomes:

$$\begin{bmatrix} B_x \\ B_y \\ B_z \end{bmatrix} = \frac{\mu_0}{4\pi r^5} \begin{bmatrix} 3\Delta x^2 - r^2 & 3\Delta x \Delta y & 3\Delta x \Delta z \\ 3\Delta y \Delta x & 3\Delta y^2 - r^2 & 3\Delta y \Delta z \\ 3\Delta z \Delta x & 3\Delta z \Delta y & 3\Delta z^2 - r^2 \end{bmatrix} \begin{bmatrix} m_x \\ m_y \\ m_z \end{bmatrix} \quad (3)$$

where $\begin{cases} \Delta x = x - x_c \\ r = \sqrt{\Delta x^2 + \Delta y^2 + \Delta z^2} \end{cases}$ where x, y and z represent the coordinates of the source, $x_c$, $y_c$ and $z_c$ the coordinates of the sensor, r the polar distance from the source to the sensor and $m_x$, $m_y$ and $m_z$ represent each of the components of the magnetic moment of the source in the cartesian coordinate system.

As mentioned above, devices are available that provide access to magnetic field gradients, in other words its spatial derivative in a given direction. Therefore in a given three-dimensional coordinate system, the expression of the magnetic field gradients is a tensor with 9 components, some of which are inter-related. Maxwell's magnetostatic laws stipulate that the divergence of the magnetic field, in other words the plot of the gradients tensor, is zero and that its rotation is also zero, in other words the tensor is symmetric. Therefore the tensor of $G_{ij}$ is composed of the total of five independent terms. This tensor can be written as follows in a cartesian coordinate system:

$$G = \begin{bmatrix} \frac{\partial B_x}{\partial x} & \frac{\partial B_x}{\partial y} & \frac{\partial B_x}{\partial z} \\ G_{12} & \frac{\partial B_y}{\partial y} & \frac{\partial B_y}{\partial z} \\ G_{13} & G_{23} & -G_{11} - G_{22} \end{bmatrix} \quad (4)$$

As shown in equation (3), a fixed magnetic dipole leads to a problem with six constant parameters, or nine constant parameters if the dipole is moving uniformly along a straight line (the same parameters vector plus the three speed parameters), and with six parameters variable as a function of time in the case of an arbitrary trajectory (x, y, z, $m_x$, $m_y$, $m_z$)

Use of Vector Magnitudes

One approach suggested in document reference [5] consists of solving the direct problem by using the complete vector gradient tensor that provides nine measurements. Only five of the nine components are really independent and therefore an additional measurement of the total field is necessary to make the problem of positioning fixed objects observable at all times. This method makes no assumptions about the source displacement and calculates the six parameters characteristic of the problem in each iteration. The authors note that it is very sensitive to measurement noise.

Diagonalization of the gradient tensor makes the solution easier. This then gives the true solution and three phantom solutions. If the source is moving, the phantom solutions may be eliminated due to their time behavior. The speed of the source can also be obtained.

In document reference [8], the author proposes a system based on two vector field measurements made on two separate measurement sites. In this application, the objective is to position an alternating dipole with known frequency and moment to study the displacement of dike elements exposed to swell. Since the modulus of the moment is known, the five parameters that are variable in time have to be estimated at each instant. The problem can be inverted if six independent measurements are taken.

In conclusion, it may be emphasized that the large number of components measured using vector measurement systems makes it possible to consider the direct problem without making any assumptions about the movement of the source. However in this case, the large number of unknowns requires the use of several observation sites. The only way of obtaining a complex system that can be treated as a single observation site is the approach using the complete gradient tensor. However as already mentioned, vector devices introduce the difficult problem of positioning measurement axes.

Use of Scalar Magnitudes

Some authors have studied positioning/tracking possibilities without making any assumption about the source movement by using several scalar magnetometers in different geographic locations. In all cases, the authors had difficulties with bad conditioning of the problem and therefore tests were carried out with initializations close to the true values, since there are very many local minima.

Another approach consists of reducing the number of unknowns and using assumptions about displacement of the source whenever possible. One frequently encountered assumption is a uniform movement along a straight line. This assumption is perfectly justifiable in a submarine context since the sources move along headings, and it may also be suitable for other applications such as motorway applications.

Document reference [6] presents a complete study of the signature measured by a directional sensor in the case of this type of relative displacement. It thus shows that the signals are broken down based on orthogonal signals, called Anderson base signals that depend on two parameters, firstly the distance between the sensor and the CPA (Closest Point of Approach) divided by the speed of the source, and secondly the distance from the source to the CPA divided by the speed:

$$\left\{ \frac{D}{V}, \frac{x-x_0}{V} = \frac{E}{V} \right\} \quad (5)$$

This decomposition is valid regardless of the measurement direction, and therefore particularly in the direction of the earth's magnetic field for scalar type sensors.

Document reference [6] then presents the adapted multidimensional filtering technique which is a tool useful for detection/optimum estimating in white noise, making use of a Neyman-Pearson type quadratic criterion.

In practice, this tool requires an appropriate algorithm and high calculation capacities if it is to work in real time. A genuinely operational implementation is described, and parametric studies such as COR detection curves, are described in document reference [7]. The author also proposes a sub-optimal positioning method based on measurements of three observation sites in the case in which the trajectory is located within the plane of the sensors. In this assumption, a single observation site does not give any positioning information since the parameters in equation (5) result in a double ambiguity, both in azimuth and in distance, and two observation sites lead to two or four phantom solutions depending on which algorithm is used to process the magnetic signatures.

Document reference [9] considers the airborne magnetic tracking; the aircraft flies at a constant speed and heading and the submarine source is considered as being motionless, considering the difference in speed between the observer and the observed body. In this case, the sensors are moving uniformly along a straight line with respect to the source, but this subject corresponds to a problem similar to the problem being considered and is quite transposable to it. Scalar sensors are installed at the end of the wing and the author uses differential measurements either between the two magnetometers at the same instant, or between two successive measurements provided by the same sensor. The positioning technique only uses a small number of successive measurements, and the method is then iterated with new measurements. This provides assurance that the source speed is negligible compared with the aircraft speed, but it is only possible to work with high signal-to-noise ratios. Another limitation to this method is due to the orders of magnitudes indicated by the mockup described in the article: the author assumes that the aircraft is flying very close to the water and that its wing span is of the same order of magnitude as the depth of the source. Consequently, the measurements made are not of the gradientmetric type and are more similar to N geographically distributed measurements.

Airborne techniques currently in use consider mainly detection and positioning methods that are based on at least two passes above the source, which is actually similar to observing from two distinct sites.

Use of Very Low Frequency Electromagnetic Indiscretions in Positioning

Documents reference [10] and [11] provide information about the use of very low frequency electromagnetic signatures, for example output from ship corrosion currents.

The first of these documents demonstrates the existence of this type of signature by a campaign of experiments. If the source is moving uniformly along a straight line, the author proposes that the envelope of the signature can be used and demonstrates the existence of an Anderson base of the same type as that described in document reference [6] in the case of magnetostatic signals. Estimated parameters are then of the same type and cannot be used to position the source from a single measurement site.

The second document proposes an inversion of the problem of positioning a fixed electrical dipole, but this technique uses two distinct measurement sites each providing access to the three components of the electrical field.

The presentation of the invention is restricted to the case of a magnetostatic dipole. However, as in document reference [10], an expression equivalent to equation (2) may be used for the quasi-static envelope of very low frequency magnetic signals due to corrosion currents. In the same way as for magnetostatic signals, these signatures may be measured by scalar magnetometers provided that it is possible as a function of their pass band.

The purpose of the invention is an information processing system capable of tracking a source moving uniformly along a straight line from a single observation site, using a type of sensor that does not a priori provide enough information for determining the position from a single observation site, and which is different from devices according to prior art by its ease of use and its compatibility with onboard applications.

DESCRIPTION OF THE INVENTION

The invention relates to a process for determining the position of a moving object characterized in that it comprises the following steps:
  scalar measurements are acquired by a set of electromagnetic sensors all installed on the same site, at a position known at each instant;
  the trajectory of the object is determined approximately by a model;
  the measurements output from each sensor are combined to obtain spatial gradient measurements representative of the vector electromagnetic disturbance of the moving object;

a vector of parameters characteristic of the model is estimated as a function of gradient measurements and as a function of the position of the sensors;

the position of the object is determined as a function of the position of the sensors and the parameters vector.

Advantageously, the following variants are possible:

in a first variant, on which others depend, electromagnetic measurements output from scalar magnetometers used in gradientmeters are used;

in a second variant, the movement of the object is modeled by a uniform movement along a straight line, the parameters vector being (θ, 3/v, v'/v), where θ is the azimuth of the object at a reference instant taken with respect to the North, r is the source/sensor distance at the same reference instant, v' is the speed of the object and v is the modulus of the speed; there is one phantom solution of the genuine solution that is (θ+π, r/v, v'/v);

in a third variant, the number of degrees of freedom in the tracking problem is reduced, for example when a set of possible trajectories of object is known;

in a fourth variant, magnetic measurements are combined with acoustic measurements in order to reduce the set of solutions; by adding measurement equations derived from acoustic information to measurement equations derived from electromagnetic information;

in a fifth variant (a refinement of the third variant), the azimuth method and the Doppler phenomenon observed in the case of sources radiating a narrow band signal around a stable central frequency, are used together;

in a sixth variant, the measurement acquisition device is maneuvered, for example by rotating it or displacing it along its own axis or otherwise, to obtain electromagnetic measurements at another location or from another angle, so that the set of solutions can be reduced by diversifying the set of observation points.

The invention can overcome the use of vector systems for the magnetic measurement. Instead, a technique is used that is based on scalar field measurements. These sensors do not have a preferred measurement direction, which makes the magnetic measurement independent of the orientation of the device. In some applications, this constraint is indispensable (marine applications, moving sensors) and in all other cases, it means that devices can be moved much more simply and quickly.

The invention uses a single observation site, despite the loss of information due to the use of scalar magnetometers to measure vector magnitudes.

In the invention, these scalar sensors are laid out as a gradientmeter within a space that is small compared with the dimensions of the application. In order to avoid re-introducing a measurement direction into the device, it is proposed to use an algorithm that only requires knowledge of the position of the sensors. In doing this, no other restrictive assumption about the variation of the gradientmetric system is necessary (rigid, fixed system, or strictly uniform movement along a straight line). This is particularly useful when the sensors are placed in moving systems, for example at the end of an aircraft wing, as a "bird", "fish sonar", or buoys, etc.

This type of scalar measurement may be made from three vector magnetometers fixed together.

Faced with the complexity of the positioning problem, vector systems initially appeared unavoidable, particularly when working from a single observation site. The invention overcomes this difficulty by making an assumption about the displacement of the source, so that the problem can be reconditioned.

Although the invention does not guarantee complete observability of the phenomenon, it can be used to estimate a remarkable parameter for a monosite device, namely the azimuth of the source at a given instant.

The only positioning ambiguity is in the parameter denoted r/V. The invention includes a number of variants in which knowledge of this parameter can easily be introduced and which then gives almost complete observability (there may be a phantom solution depending on the application) or complete observability in three dimensions in the best cases with maneuvering.

As described above, different variants are possible; restriction of the number of degrees of freedom of a problem, merging with other indiscretions, for example narrow band acoustic merging, displacement of the carrier with at least one maneuver to make the problem observable.

The process according to the invention can be used to combine several measurement types derived from different physical phenomena such as acoustic phenomena (mentioned above), wide band phenomena, electromagnetic phenomena generated by the loopback of corrosion currents by the sea or emission from the onboard network.

Thus, wide band scalar magnetometers and possibly electrometers are available to make use of the wide band physical phenomenon associated with the electromagnetic emission from a source (ship) due to corrosion currents modulated by the propulsion system. The theory of this phenomenon is described in detail in document reference [10]. Measurements are processed in the same way as before; making use of the components of the electrical dipole moment of the source (assumed with a good approximation to be horizontal, namely one component) and the modulation frequency f0 that can be estimated using a high resolution spectral analysis algorithm.

Other electromagnetic phenomena may be used in marine environments like the electromagnetic emission generated by the loopback of corrosion currents by the sea or emission from the ship's electrical network. They can be used in the proposed system, all that is necessary is to clearly state the corresponding observability problem and to integrate the corresponding additional parameters into the measurement and state vectors.

DETAILED DESCRIPTION OF AN EMBODIMENT

Consider a point in the plane defined by the trajectory of the source and by the observation site. Alternately, the plane of movement of the source known with respect to the observation site could be used. In general, the observation site may itself be moving with an arbitrary but known movement.

The invention uses the quasi-static contribution of the electromagnetic signature of the source. This type of signature may be due to the presence of ferromagnetic elements in construction materials of the mobile and then corresponds to a magnetostatic contribution. In the case of submarine sources, it may also be the quasi-static envelope of the very low frequency electromagnetic signature, as it was demonstrated in document reference [10].

In the invention, the electromagnetic measurements are output from scalar magnetometers used in a gradientmeter, the positions of which are known at each instant. These sensors provide access to the modulus of the useful magnetic signal, unlike vector, magnetic or electrical sensors that measure one or several components of the electromagnetic signal.

The invention provides access to the azimuth of the source, the direction and the sign of its speed vector, and to the r/V parameter where r is the distance from the source to the sensor and V is the modulus of the speed, from a single observation site and for a reference instant. The r/V parameter emphasizes the distance ambiguity related to this type of measurement.

When one of the components of the speed vector or its modulus or a source-sensor distance at one or more reference instants can be known in advance or can be estimated by means of a complementary technique (acoustic Doppler, radar, laser distance meter, etc.), the tracking problem in the plane then becomes observable, except for a single phantom solution.

The invention contains details of a solution based on use of the Doppler phenomenon for narrow band acoustic sources and an industrial application using a priori information, but other possibly active solutions are perfectly possible as a function of the application domain and indiscretions emitted by the source.

Finally, when the measurement device is moving and can be maneuvered, the object positioning problem can be made completely observable in three dimensions due to these maneuvers.

Figure 1:
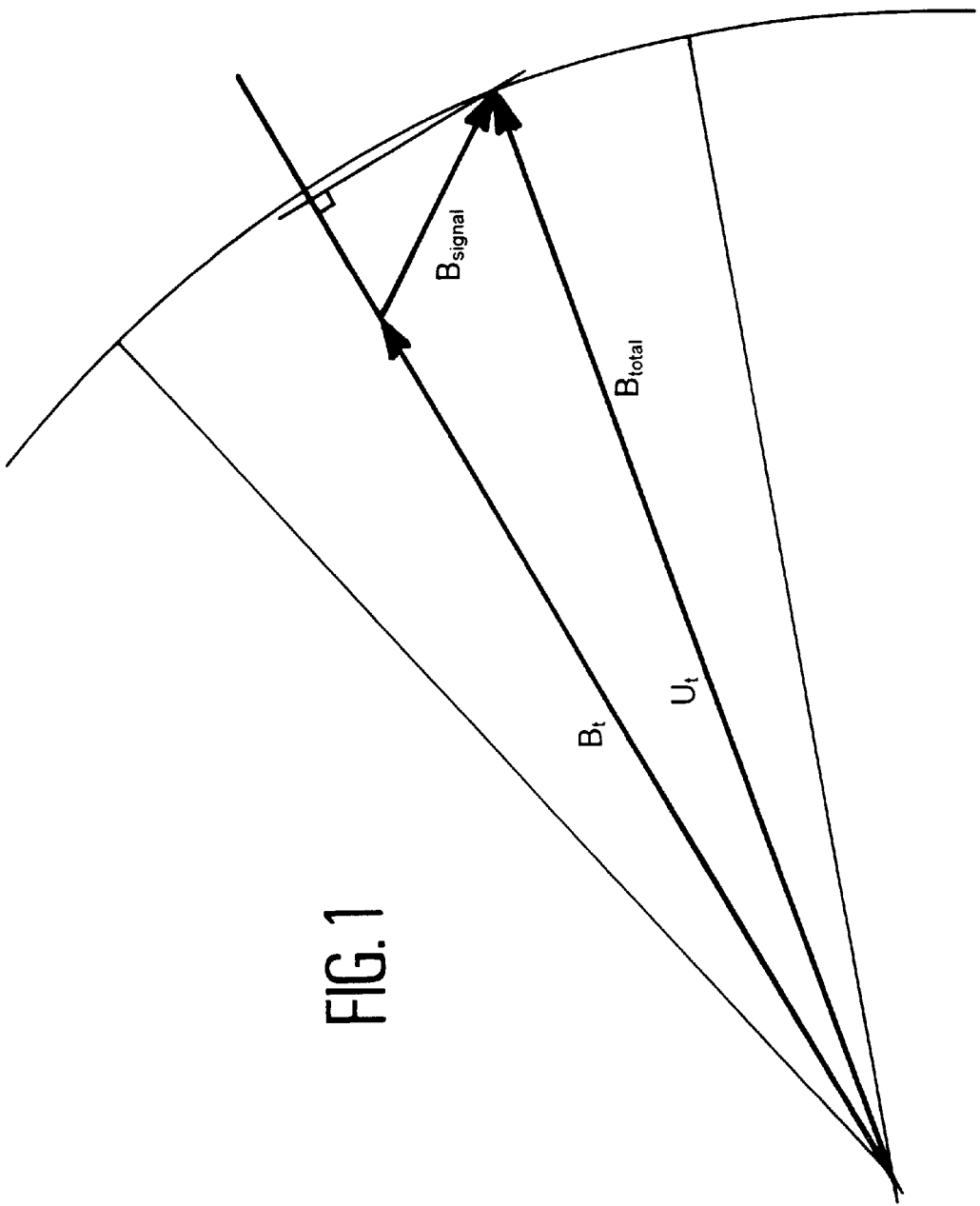
FIG. 1 illustrates a comparison between firstly the vector sum of the earth's magnetic field $B_t$ and the magnetostatic disturbance to be measured $B_{signal}$, and secondly the algebraic sum of the earth's magnetic field and the projection of the disturbance onto the earth's magnetic field in a device according to prior art.
Figure 2:
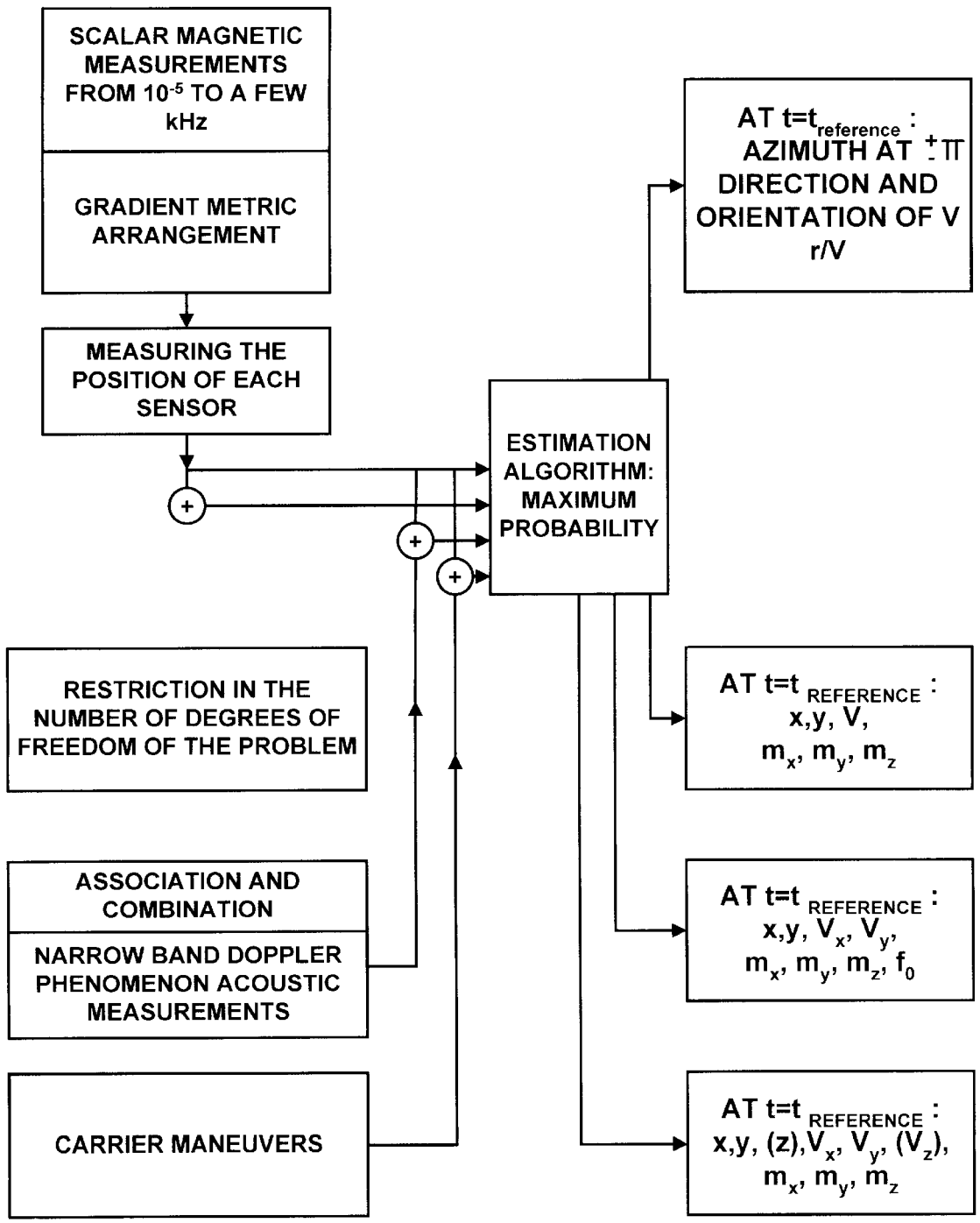
FIG. 2 illustrates the block diagram for the process according to the invention.

FIG. 2 shows the block diagram of the process according to the invention, with the different possible variants.

Estimate of the Source Azimuth Using a Single Gradientmetric Measurements Site In prior art, it is clear that the large number of variables to be estimated to solve the positioning/tracking problem requires a correspondingly large amount of information, and therefore a priori vector measurements are obtained either from several observation sites, or providing access to the complete tensor of magnetic field gradients. However, the difficulties in using vector measurement means were emphasized, particularly in marine environments and for onboard applications.

The invention proposes to use scalar gradientmetric measurements made on a single observation site. In order to make full use of the deployment flexibility of this type of system based on scalar sensors, an algorithm is described that only requires knowledge of the position of the sensors at each instant; in doing this, no restrictive assumption (rigid, fixed system or system with a strictly uniform movement along a straight line) is necessary about the movement of the gradientmetric system, except to solve some observability problems.

In order to estimate the parameters vector, the invention uses an algorithm that maximizes the probability of the tracking parameters vector or state vector, with respect to the probability distribution of measurement noise. When measurement noise is approximately gaussian, it is advantageous to use minimization algorithms, for example least squares algorithms, to minimize the error between the measured signals and the signals reconstructed with the model used to approximate the trajectory of the object.

The technique that maximizes the probability is conventionally and generically called the "Maximum Probability algorithm or technique". There are several implementations of this technique. One of them could be called "Exhaustive Search on a Mesh". The procedure consists of defining a mesh with N dimensions on each of the component parameters of the state vector, where N denotes the size of this vector. The next step is to calculate the probability of available measurements as a function of the state vector on each of the nodes of the mesh and select whichever maximizes this probability. Assuming that measurement noise is gaussian, the Maximum Probability problem is equivalent to a Least Squares problem; the objective is to minimize the quadratic difference between available measurements and measurements reconstituted from the state vector. This is the approach that is used here. The Levenberg-Marquardt algorithm is used in the calculations. Different variants of the Gauss-Newton and Fletcher-Reeves algorithms can also be used. Finally, when the measurement equations are not linear (which is not the case here) there is a complete series of Least Squares and possibly recursive algorithms such as the RLS ("Recursive Least Squares"), MLS ("Mean Least Squares") algorithms, etc.

A source trajectory model is used in order to integrate a large number of these measurements into each step of the probability maximization process. In the following, we will restrict ourselves to the example of uniform movement along a straight line and all analyses, mainly concerning observability of the parameters vector, are related to this type of model.

However, other trajectory models can be used in a similar manner. In the case in which the very low frequency electromagnetic contribution is used, it is worth noting the examples of a turn in a motorway or an airport runway if the vehicle or aircraft are instrumented by an active electromagnetic dipolar source, and the case of a channel for a submarine:

the curvatures of the turn, runway or channel are regular and known;

the modulus of the speed of the source can be assumed to be constant;

the position of the source on this trajectory can then be described by a time lag with respect to a known reference time, and the modulus of the speed.

If the magnetostatic component of the signature is used, uniform movement along a straight line also has to be assumed so that the magnetic moment of the vehicle can be assumed to be a constant vector (in time and in space), since its induced part depends on the orientation of the source in the earth's magnetic field. If the trajectory can be modeled by a series of straight lines, the state vector can contain N times the three components of the magnetic moment, where N is the number of segments in the series of straight lines.

In the case of a uniform movement along a straight line (speed v=V=constant) in a plane, the trajectory is fully defined by the position of the mobile at a known reference instant $t_{ref}$ and by the components x and y of its speed. In cartesian coordinates, this state vector x related to this reference instant is written:

$$x = [x_{tref} Y_{tref} \dot{x} \ \dot{y}]^T \tag{6}$$

in other words x is the transposition of $x_{tref}$ $y_{tref}$ $\dot{x}$ $\dot{y}$.

Studies have shown the advantage of gradientmetric measurements at a measurement site and good conditioning of the problem. Some measurements of the gradient tensor (equation (4)) are redundant when observing sources with a uniform movement along a straight line. The invention based on scalar magnetometers consists of forming the only three possible independent gradients, in other words observing a linear combination of three tensor lines, since the only accessible measurement direction is the direction of the earth's magnetic field.

described in document reference [10] or to take account of a more or less complex displacement of the measurement system (for example an airborne system).

In the case considered, the $m_x$, $m_y$ and $m_z$ components of the magnetic moment of the source are characteristic parameters of the state of the source and must therefore be integrated into the state vector x (see equation (6)) characterizing the trajectory:

$$x = [x_{tref} Y_{tref} \dot{x} \dot{y} m_x m_y m_z]^T \tag{7}$$

In order to simplify the equations, it is assumed that the gradient measurement directions are the directions of the axes in the previous coordinate system. The measurement of the scalar gradient along the direction of the x axis is denoted $g_x$. The measurement vector $z_k$ (or vector z at instant k) is then written:

$$z_k = [g_x g_y g_z]_k^T \tag{8}$$

Figure 8:
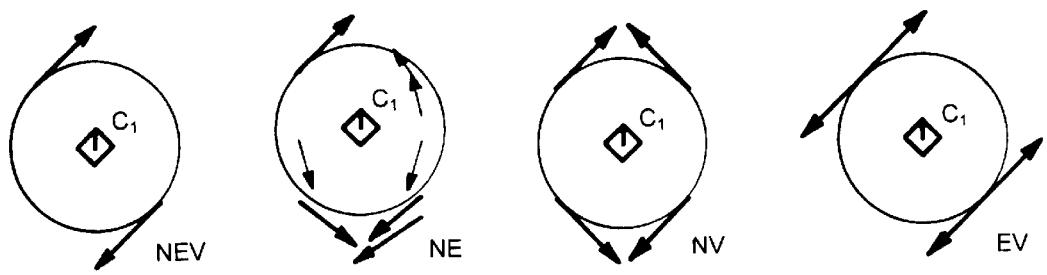
FIG. 8 illustrates the representation of geometric variables of a vector for initializations that converged to a global minimum.

In practice, non-orthogonal gradient directions are quite possible and are even an advantage for this estimated technique. However as shown in FIG. 8, it is preferable if the three gradient measurements provide access to each of the three possible directions.

Figure 3:
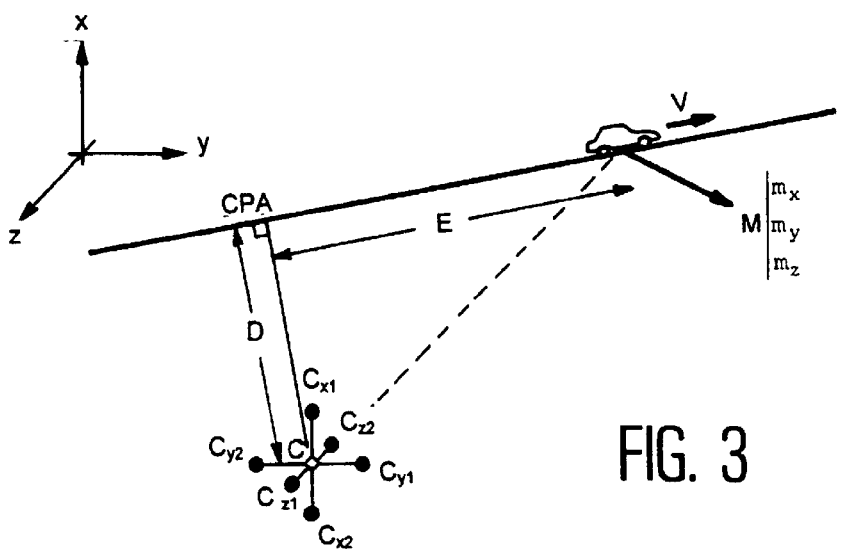
FIG. 3 illustrates an example geometry for changing from a magnetostatic force with respect to a scalar gradientmetric measurement system.

In the magnetostatic case, each of the three independent gradient measurements is written as the difference between two magnetic field measurements to which a disturbing noise is added, that is modeled very realistically by a centered gaussian white noise W:

$$\begin{bmatrix} g_x \\ g_y \\ g_z \end{bmatrix} = h \left( \begin{bmatrix} X_{tref} \\ Y_{tref} \\ \dot{x} \\ \dot{y} \\ m_x \\ m_y \\ m_z \end{bmatrix}, t_k t_{ref}, x_{c\xi 1}, y_{c\xi 1} \right) + w_k = \begin{bmatrix} \frac{B_{cx2} - B_{cx1}}{x_2 - x_1} \\ \frac{B_{cy2} - B_{cy1}}{y_2 - y_1} \\ \frac{B_{cz2} - B_{cz1}}{z_2 - z_1} \end{bmatrix} + w_k \tag{9}$$

where:

$$x = x_{tref} + \dot{x}(t_k - tref) \text{ and } y = y_{tref} + \dot{y}(t_k - tref) \tag{10}$$

$$B_{c\xi 1} = \frac{\mu_0}{4\pi r^5} \begin{bmatrix} \cos(Inc)\cos(Dec) \\ \cos(Inc)\sin(Dec) \\ -\sin(Inc) \end{bmatrix}^T \begin{bmatrix} 3\Delta x^2 - r^2 & 3\Delta x\Delta y & 3\Delta x\Delta z \\ 3\Delta y\Delta x & 3\Delta y^2 - r^2 & 3\Delta y\Delta z \\ 3\Delta z\Delta x & 3\Delta z\Delta y & 3\Delta z^2 - r^2 \end{bmatrix} \begin{bmatrix} m_x \\ m_y \\ m_z \end{bmatrix}$$

where $\begin{cases} \Delta x = x - x_{c\xi 1} \\ r = \sqrt{\Delta x^2 + \Delta y^2 + \Delta z^2} \end{cases}$ FIG. 3 illustrates an example of a geometry for changing from a magnetostatic source with respect to a scalar gradientmetric measurement system. Three gradients independent of the magnetic field are accessible by means of the three pairs of sensors $C_{xi}$, $C_{yi}$, $C_{zi}$ where i ∈ [1,2]. The position of the system is referenced by the coordinates $x_c$ and $y_c$, of point C; D denotes the distance between the sensor and the closest point of approach (CPA); and E denotes the distance between the source and the CPA.

In FIG. 3 and in the following, the measurement equations are described in detail for the case of a source characterized by its magnetostatic properties and in the case of a fixed sensor. Similar developments may be carried out starting from very low frequency electromagnetic equations for i=1 and 2 and ξ=x and y and z.

Inc and Dec denote the inclination and declination of the earth's magnetic field at the location of the measurement, which defines the measurement direction of scalar magnetic sensors.

Starting from K measurements of the $(g_x, g_y, g_z)^T$ triplet, the maximum probability technique selects the parameters vector x such that the difference between the measured magnitudes and the reconstructed signatures starting from vector x result in the production of measurement noise $w_k$ that best conforms with its probability density (ddp). In the case of centered and gaussian measurement noise, the same parameters vector x also minimizes the quadratic difference between measured magnitudes and reconstructed signatures and corresponds to a least squares problem.

This estimate of the state vector x may be made using two concurrent approaches:

The first approach is called the "exhaustive" approach, and is based on a fine or coarse mesh of parameters to be estimated, and selects the vector that maximizes the probability. This approach is often expensive in terms of calculation time, particularly for vectors with seven parameters, and the quality of its result depends on the fineness of the mesh to be investigated.

The second approach is called the "successive iterations" approach, and is applicable to the solution of least squares type problems. It starts from an estimate $x_k$ of the direction with the strongest gradient of the measurement function and possibly its second order derivatives, to build a better quality estimate $x_{k+1}$. In the case of non-linear measurement functions, there is a problem with these techniques due to the existence of many local minima and therefore in choosing the initialization, or the large number of initializations.

Tests for stopping "iterative" methods and to determine the estimate quality are based on a $\chi^2$ indicator that takes a quadratic difference between the measured data and data reconstructed from the current or estimated state vector x, weighted by the measurement covariance matrix. If there are N measurements each containing K samples, this indicator follows a $\chi^2$ law with NK-dim(x) degrees of freedom.

Figure 7:
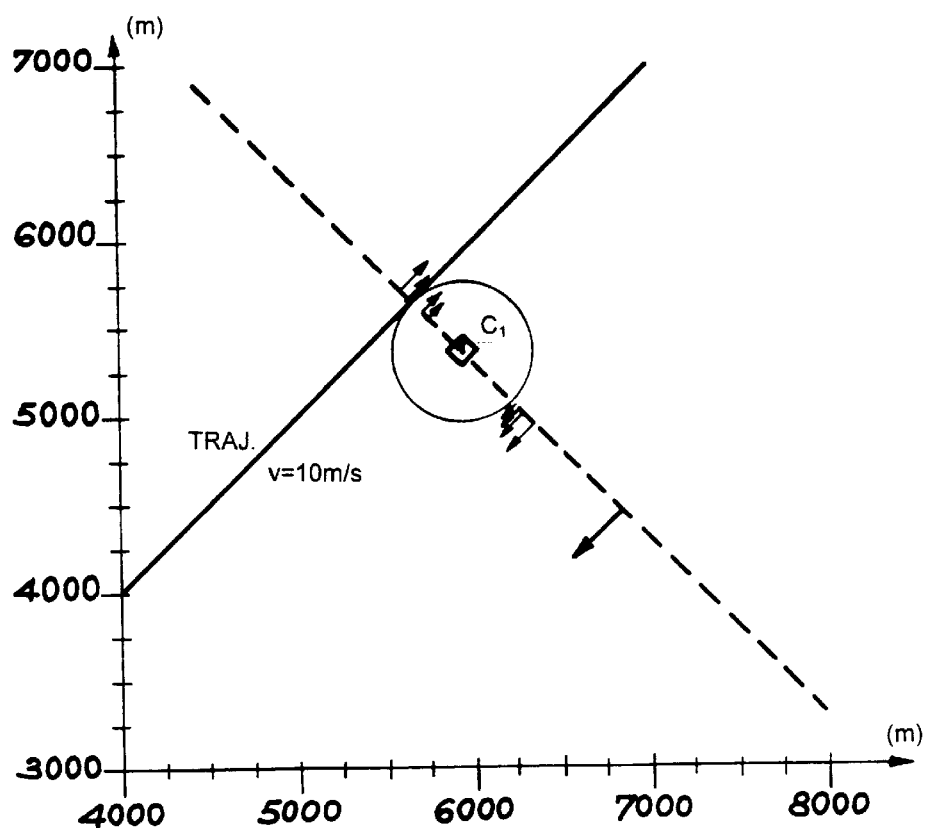
FIG. 7 illustrates the representation of nine initializations that converge towards a global minimum.

If the source is moving uniformly along a straight line with respect to a fixed gradientmetric site providing access to the three independent gradients of the scalar measurement of the magnetic field, the observable parameters are:

the algebraic magnitudes E/V and D/V, and the heading of the trajectory ±π, or which is equivalent (see FIG. 7)

the azimuth of the source ±πV'/V for each of the two azimuths, and the r/V parameter, where D denotes the distance between the sensor and the closest point of approach (CPA); E is the distance between the source and the CPA, r is the source-sensor distance and v' is the source displacement speed, and V is its modulus.

The device does not necessarily have to be placed in the plane of the trajectory. For example, it may be located higher, provided that this height is known and does not introduce an additional unknown into the problem. The same is true for its derivative dz/dt. In this case, the measurement equations (9) and (10) need to be modified slightly.

Use of the Source Azimuth for Tracking

An estimate of the azimuth of a very low frequency magnetostatic or electromagnetic source from a single observation site is a remarkable result that can be used in different ways for positioning/tracking the source.

Restriction in the Number of Degrees of Freedom of the Problem

In some applications, the number of degrees of freedom in the tracking problem can be reduced. If two parameters of the state vector defined in equation (7) are related by a known linear relation, the vector x can be observed, except for a single phantom solution. When only one of the seven parameters in the state vector defined in equation (7) is known, the reduced vector composed of the other six parameters is also observable, except for a single phantom solution.

Use of Other Indiscretions of the Source and Data Merging

True sources usually reveal their presence through several indiscretions (noise, electromagnetic radiation in different frequency bands) and may also be detected or positioned by active techniques (radar, active sonar, etc.). Therefore, depending on the envisaged application, any complementary technique can be added in order to eliminate the r/V ambiguity.

One variant of the invention is the association of the previous azimuth method and the Doppler phenomenon observed in the case of sources radiating a narrow band signal around a stable central frequency. This is particularly characteristic of acoustic submarine sources observed in passive sonar.

After a step in which the received frequency is estimated (or "extracted") as described in documents [12] and [13], a sequence of measurements $f_k$ of the received acoustic frequency is available. Used alone, it is shown that these measurements can be used to estimate the parameters vector:

$$x = [t_{CPA} D V f_0]^T \tag{11}$$

where $t_{CPA}$ denotes the moment of passing through the CPA; D is the sensor-CPA distance; V is the speed of the source; and $f_0$ is the central emitted frequency.

A first advantage of this acoustic technique is that missing parameters in the D and V scalar gradientmetric technique are observable in this case. A second advantage is the compactness of the acquisition system, an omni-directional hydrophone, which maintains the "monosite" nature of the dual observation device (acoustic and magnetic).

Maximum probability techniques make it easy to take account of measurements available on a variety of occurrence dates. Equations can be simplified by assuming that the sampling frequencies for measurements of acoustic frequency and magnetic gradients are the same. Consequently, the measurement vector becomes:

$$z_k = [g_x g_y g_z f]_k^T \tag{12}$$

A state vector similar to the vector defined in equation (7) is then used with the tracking parameters given in cartesian coordinates. However, the emitted central frequency $f_0$ is a characteristic parameter of the problem state, and therefore must be added to this parameters vector:

$$x = [x_{tref} Y_{tref} \dot{x} \dot{y} m_x m_y m_z f_0]^T \tag{13}$$

The expression for the Doppler phenomenon expressed in Cartesian coordinates can then be used as described in document reference [14], which gives the new measurement equation:

$$\begin{bmatrix} g_x \\ g_y \\ g_z \\ f \end{bmatrix}_k = h \left( \begin{bmatrix} X_{tref} \\ Y_{tref} \\ \dot{x} \\ \dot{y} \\ m_x \\ m_y \\ m_z \\ f_0 \end{bmatrix}, t_k t_{ref}, x_c, y_c, x_{c\xi}, yc\xi l \right) + \tag{14}$$

$$w_k = \begin{bmatrix} \dfrac{B_{cx2} - B_{cx1}}{x_2 - x_1} \\ \dfrac{B_{cy2} - B_{cy1}}{y_2 - y_1} \\ \dfrac{B_{cz2} - B_{cz1}}{z_2 - z_1} \\ f_0 = \dfrac{1}{1 + \dfrac{1(x - x_c)x = (y - y_c)y}{c\sqrt{(x - x_c)^2 + (y - y_c)^2}}} \end{bmatrix} + w_k$$

Due to the association of narrow band magnetic and acoustic information, tracking of the source and an estimate of its magnetic moment can be completely observed, except for a single phantom solution. The emitted central frequency is estimated without a phantom.

Carrier Maneuvers

One final variant is suggested by work done in document reference [15] on the observability of tracking systems based solely on angular readings from a single observation platform. In particular, this domain concerns towed linear antennas for passive sonar. In the absence of any acceleration of the antenna carrier ship, it is impossible to solve the problem of tracking a source that is also moving uniformly along a straight line. In this case, the problem is slightly different since the azimuth is not obtained recursively, but only after the source has passed.

In the invention, the vector that can be observed from a platform moving uniformly along a straight line (aircraft, towed submarine system) is identical to the case of a fixed platform. Therefore, a maneuver by the carrier is essential and makes the state vector defined in equation (7) completely observable, in other words there are no longer any phantom solutions. When three gradients are used, the three-dimensional version of the state vector may also be completely observable:

$$x = [x_{tref} y_{tref} z_{tref} x y z m_x m_y m_z]^T \quad (15)$$

Several measurement configurations are possible to ensure that the vector defined in equations (7) or (15) is observable.

| | | |
|---|---|---|
| Configurations with three gradients | North, East, Vertical | (15) observable |
| Configurations with two gradients | North, East | (15) observable |
| | North, Vertical | (15) observable |
| | East, Vertical | (15) observable |
| Configurations with one gradient | North | (7) observable |
| | East | (7) observable |

Configurations with one gradient produce very many local minima that are difficult to discriminate from the true solution.

The vertical gradient used alone can also be used to estimate the state vector defined in equation (7), except for one phantom solution. The conditioning quality is very good, so that it is very easy to converge to the true solution or to the phantom solution.

The three dimension state vector without z has the same observability as the vector defined in equation (15):

$$x = [x_{tref} y_{tref} z_{tref} x y m_x m_y m_z]^T \quad (16)$$

The result becomes increasingly precise as more maneuvers are carried out.

Numeric Examples

These examples are representative of the positioning/tracking problem for a submarine mobile.

Figure 4:
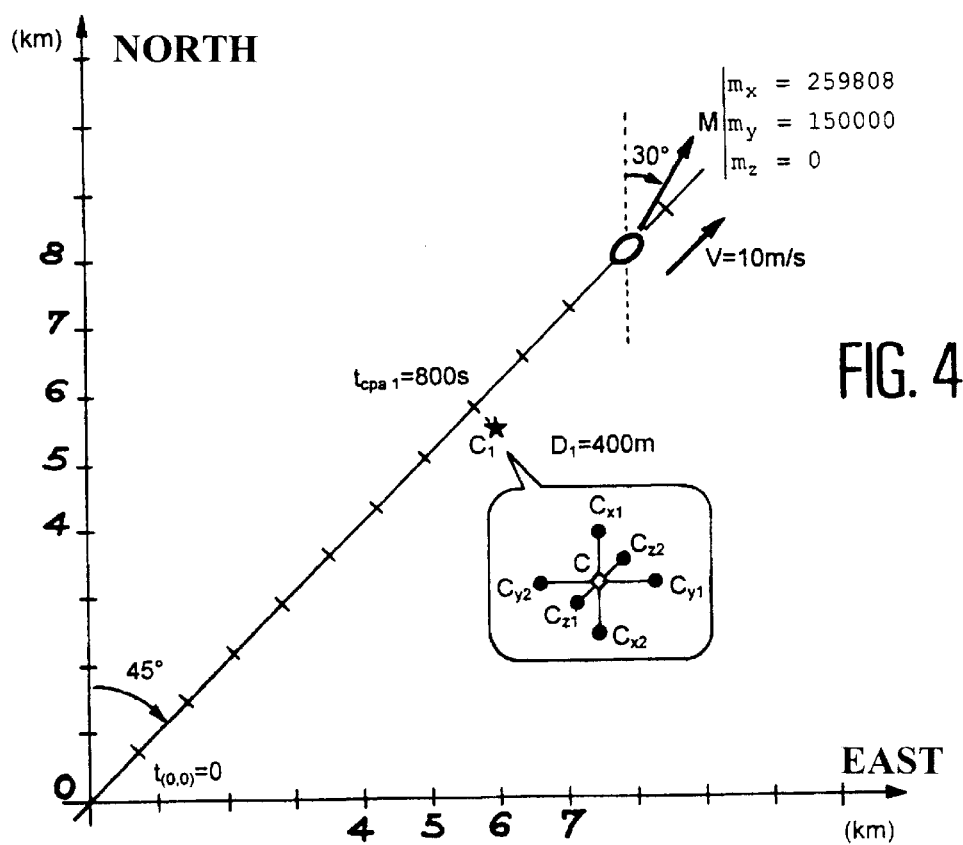
FIG. 4 illustrates the geometry for changing from a magnetostatic and acoustic source with a uniform movement along a straight line relative to a gradientmetric device and to an acoustic sensor.

FIG. 4 illustrates the geometry of a magnetostatic and acoustic source moving uniformly in a straight line past a gradientmetric device and an acoustic sensor. The source passes at 10 m/s at a distance D1 at the CPA of 400 meters. The magnetic moment of the source has a modulus of 300 000 A.m2 at an inclination of 0° and 30° declination. The time origin is assumed to be (0,0) and the source passes the CPA at t=800 sec. The base length of the gradientmeters is 5 meters in each of the three directions.

The standard deviation of the measurement noise on each gradientmetric measurement is fixed at $3.10^{-4}$ nT/m (where nT is the nanotesla unit).

Figure 5A:
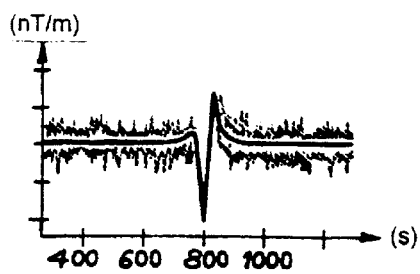
FIGS. 5A to 5C illustrate signatures recorded at a site by three scalar gradientmetric devices facing the North, East and Downwards vertical directions, respectively.
Figure 5B:
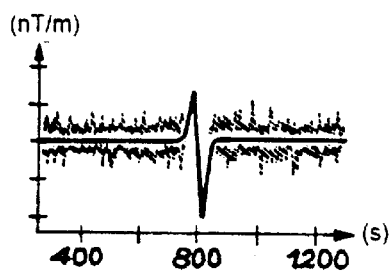
Figure 5C:
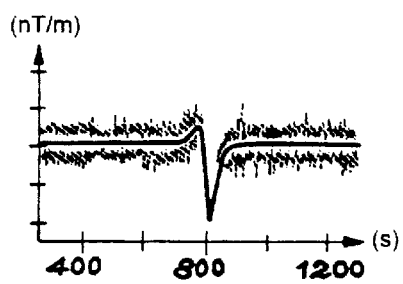

FIGS. 5A, 5B and 5C illustrate the signatures recorded at site $C_1$, by three scalar gradientmetric devices along the North, East and downwards Vertical directions respectively. The theoretical noise-free signatures are shown in black on the foreground. A measurement noise of $3.10^{-4}$ nT/m corresponding to a 5-meter base length is added and is shown in grey in the background. The measurement acquisition recurrence is 2 Hz.

Multiple Initializations

The estimate of the parameters vector with the maximum probability is made using a non-linear Levenberg-Marquardt least squares algorithm. One difficulty with this type of minimization algorithm based on successive iterations is in the initialization procedure.

Ideally, an initialization mesh should be defined for each of the seven parameters in the state vector, followed by minimization with each possible initial configuration, and the results should then be classified as a true or phantom solution, or as a local minimum. This is difficult in practice due to the large number of parameters and is also dependent on the scenario.

It is proposed to restrict the number of initializations using a principle similar to the principle described above:

Knowing the potential of the system, the minimum distance $D_{min}$ below which the dipolar description of the source is no longer valid, and a maximum distance $D_{max}$ above which the contribution of the source is usually lost in the measurement noise, can be evaluated;

two intermediate distances are then chosen, in this case 500 and 1000 meters, defining the radii of two circles on which eight initial equally distributed positions are determined;

The reference instant is chosen approximately at the instant of passing through the CPA;

The direction of the initial speed at each point is then tangent to the circle;

The modulus of the speed is initialized at about 8 m/s;

The parameters of the magnetic moment are completely unknown, but appear linearly in the measurement equation: each of the components is initialized at $10^4$ A.m$^2$.

Figure 6:
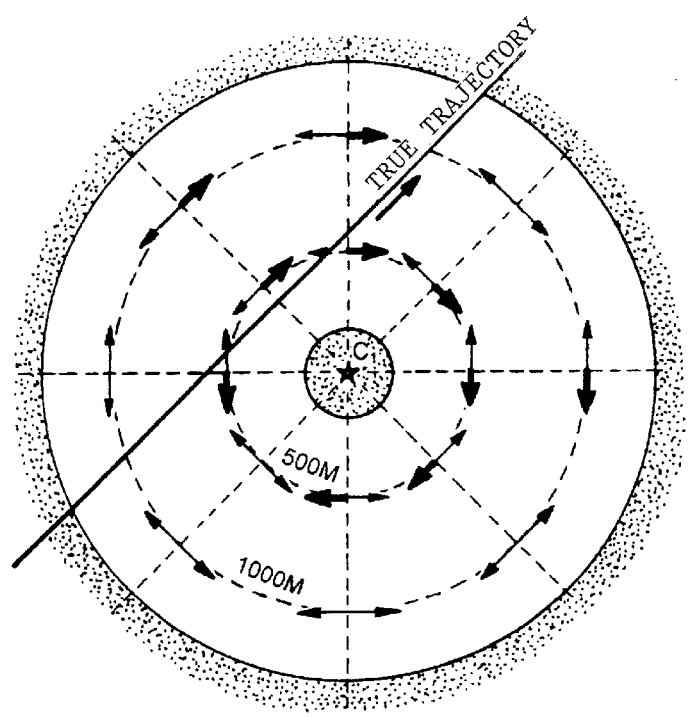
FIG. 6 illustrates the initialization mesh for a minimization algorithm based on successive iterations.

This gives a total of thirty-two initializations presented in FIG. 6. FIG. 6 illustrates an algorithm initialization mesh. The starting point of each arrow corresponds to the coordinates of the initial positions and the arrow itself represents the direction and sign of the associated speed. The moduli of the velocities are about 8 m/s. The thin arrows show the initializations that converged to a local minimum. The thick arrows show the initializations that converged to a global minimum.

Out of the thirty-two initializations, nine converge towards "global minima" in other words the $\chi^2$ parameter translates good agreement between true noise-free measurements and reconstructed measurements. Therefore in practice, a system for sorting state vectors estimated by the algorithm from the previous initializations is set up. Criteria are based on the $\chi^2$ parameter, but also on prior knowledge of the range of measurement systems, the range of variation of the speed of sources and the range of magnetic moments of sources.

The geometric magnitudes estimated starting from these four initializations are positioned in FIG. 7, and are used to conclude that the cartesian state vector (7) is not completely observable.

FIG. 7 illustrates a representation of nine initializations that converge towards a "global minimum" for a trajectory TPAJ.

However, the alignment of these results is remarkable and it is checked that:

the estimated positions of the mobile at the instant of passing through the CPA are along the single straight line passing through $C_1$ and the true CPA;

the direction of the speed is always oriented along the trajectory;

the sign of the speed is towards the North-East for positions North of the sensor and towards the South-West for positions to the South of the sensor;

finally, the distance between the estimated position and the sensor (which, given the reference instant, is equal to the distance D to the CPA, divided by the modulus of the estimated speed V) is constant. The constant parameter D/V used in Anderson's basic functions is also used here.

For the estimate of the magnetic moment, it can be noted that the values of its components are very different for each of the nine solutions. In fact, the measurement equation is linear depending on the magnetic moment; therefore, for any set of the four geometric variables ($x_{tref}$, $y_{tref}$, dc/dt, dy/dt), it is certain that a single magnetic moment vector that produces a minimum will be found. This validates the approach according to the invention that consists of initializing the magnetic moment with a single vector with three components.

When the reference instant is not the instant of passing through the CPA, the D/V parameter can be reconstructed using the orientation of the trajectory supplied by the components of the source speed. Since the distance between the sensor and the estimated position relative to the speed is always known, the delay parameter E/V at the CPA can also be found, and is used within the framework of Anderson's basic functions.

Restriction of the Number of Degrees of Freedom in the Problem

In this example, it is assumed that one of the speed components is known. This is not equivalent to fixing the modulus of the speed or its direction, but rather to identifying its second component if the direction can be observed from gradientmetric measurements. Therefore, for these tests, the state vector to be estimated becomes:

$$x=[x_{tref}, y_{tref}, m_x, m_y, m_z]^T \quad (17)$$

With this technique applied to noise-free signals, it is observed that eight out of the thirty-two initializations converge either towards the true state vector, or to its diametrically opposite phantom solution (see the NEV part in FIG. 8). The other initializations converge towards local minima.

FIG. 8 illustrates a representation of geometric variables of vector x' for initializations that converged towards a global minimum. N denotes the North gradient, E the East gradient and V the Vertical gradient. NEV denotes the combination of these three gradients. The result is eight convergences in NEV, eleven in NE, thirteen in NV and eleven in EV.

This same figure shows the role played by each of the gradient directions in the estimating process. The vertical gradient is essential and the third direction, North or East, eliminates phantom solutions.

The following table presents the performances in the estimation of the reduced state vector x'. Monte-Carlo simulations based on two hundred independent productions of the measurement noise are used within the previously described scenario. The first line shows the gradient configuration, b denotes the bias and 94 the standard deviation calculated from the two hundred minimization results.

|  | NV | EV | NEV |
|---|---|---|---|
| $X_{tref} = 6000$ m | b = 0.88 | b = 0.10 | b = 0.72 |
|  | σ = 12.98 | σ = 14.67 | σ = 10.24 |
| $X_{tref} = 6000$ m | b = 2.32 | b = 0.07 | b = 1.43 |
|  | σ = 19.18 | σ = 18.66 | σ = 13.79 |
| dx/dt |  |  |  |
| dy/dt = 7.0711 m/s × $10^{-2}$ | b = 2.93 | b = 0.75 | b = −2.95 |
|  | σ = 39.70 | σ = 43.28 | σ = 31.58 |
| $m_x = 259808$ A.m$^2$ | b = −704. | b = −2105 | b = 498. |
|  | σ = 24892. | σ = 30888. | σ = 20879. |
| $m_y = 150000$ A.m$^2$ | b = 709. | b = −1842 | b = 741. |
|  | σ = 22419. | σ = 27777. | σ = 19229. |
| $m_z = 0$ A.m$^2$ | b = −135. | b = −738 | b = 215. |
|  | σ = 7108. | σ = 6246. | σ = 4783. |

Merging Three Scalar Gradientmetric Measurements and a Narrow Band Acoustic Frequency Measurement The Doppler effect due to relative displacement of the source and the sensor is also considered, starting from the scenario in FIG. 4. The central frequency of the emitted acoustic signal is 200 Hz and it is disturbed by noise with a standard deviation of 0.05 Hz in this simulation. Using measurement equation (14), the Monte-Carlo simulations give the results shown in FIG. 9.

Figure 9A:
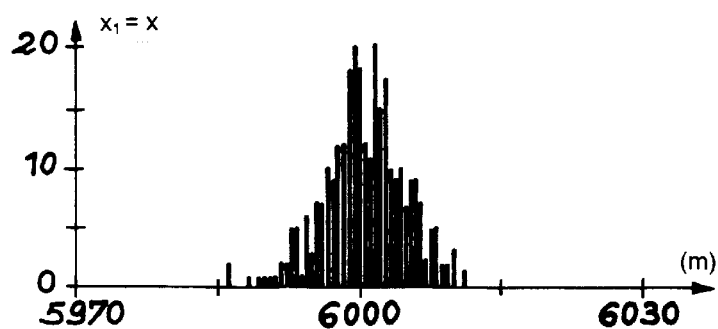
FIGS. 9A to 9H illustrate Monte-Carlo simulations of 500 embodiments.
Figure 9B:
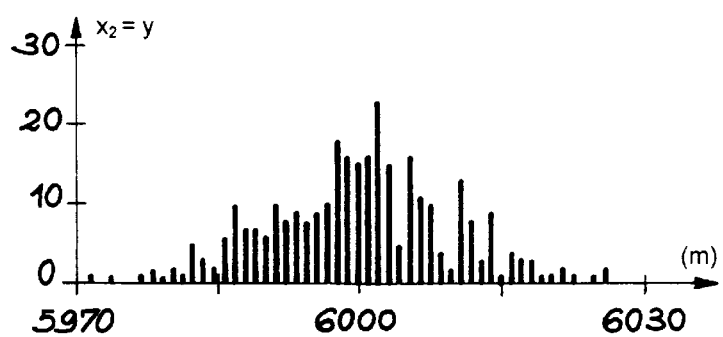
Figure 9C:
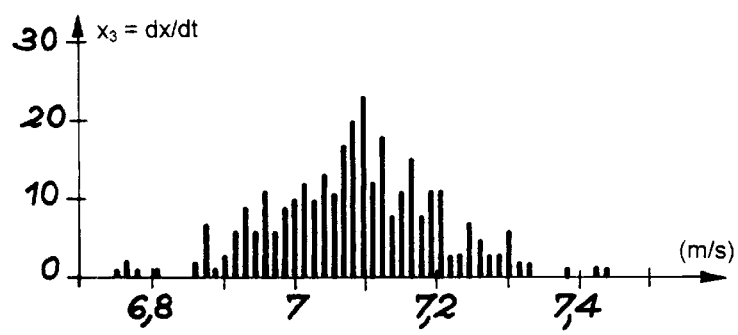

These FIG. 9 illustrate Monte-Carlo simulations for 500 productions. The CPA is at t=800 s. The source moves in the North-East direction at 10 m/s at a minimum approach distance of 400 m. The magnetic moment of the source has a modulus of 300000 A.m$^2$ with an inclination of 0° and declination of 30°. The source emits narrow band noise centered around 200 Hz. The measurement acquisition recurrence is 2 Hz. The standard deviations of the noise are [$3.10^{-4}$, $3.10^{-4}$, $3.10^{-4}$, 0,05] (in [nT/m, nT/m, nT/m, Hz]). For each parameter, the bias is denoted best and the standard deviation is denoted $\sigma_{est}$, thus giving the following values:

| Industrial applications | |
|---|---|
| FIG. 9A: | $x_1 = x$ |
|  | $b_{est} = 0.9082E-01$ |
|  | $\sigma_{est} = 0.4373E+01$ |
| FIG. 9B: | $x_2 = y$ |
|  | $b_{est} = 0.6948E+00$ |
|  | $\sigma_{est} = 0.9735E+01$ |
| FIG. 9C: | $x_3 = dx/dt$ |
|  | $b_{est} = 0.7178E-02$ |
|  | $\sigma_{est} = 0.1151E+00$ |

Figure 9D:
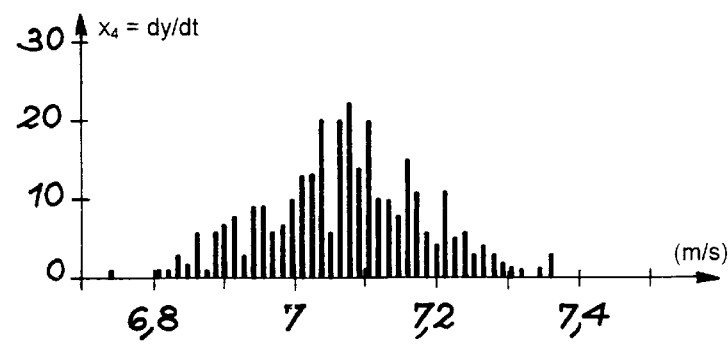
Figure 9E:
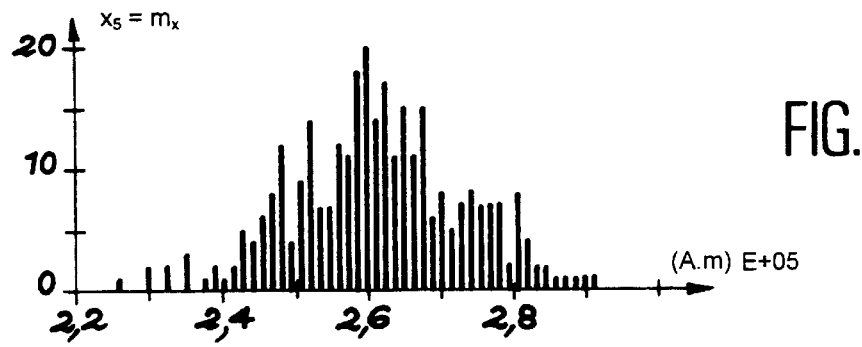
Figure 9F:
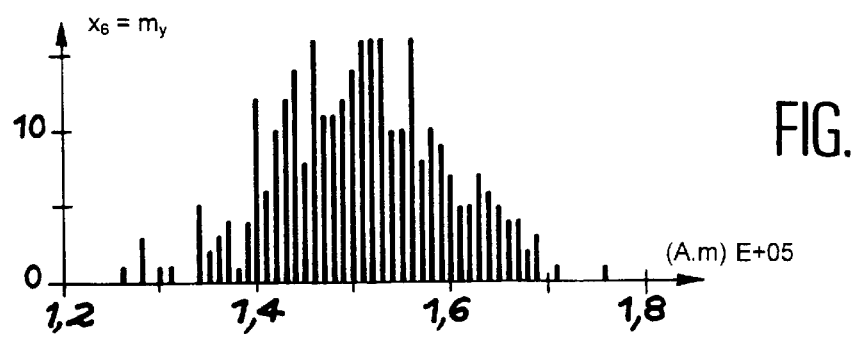
Figure 9G:
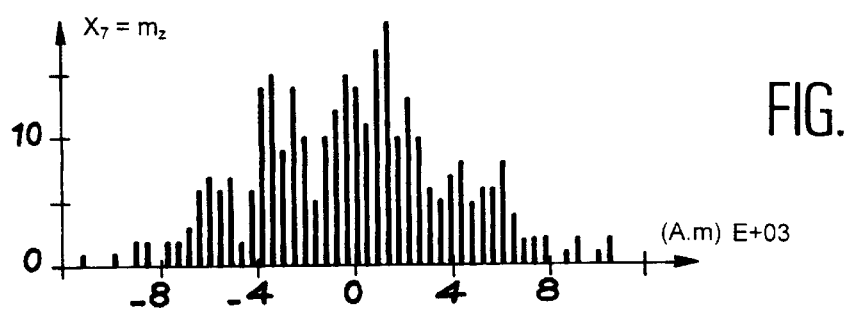
Figure 9H:
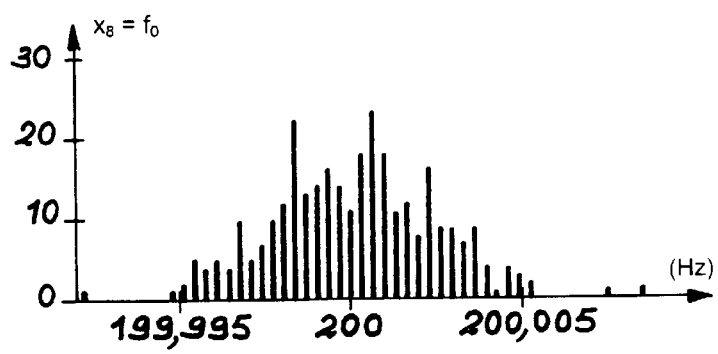

| Industrial applications | |
|---|---|
| FIG. 9D: | $x_4 = dy/dt$ |
| | $b_{est} = 0.7445E-02$ |
| | $\sigma_{est} = 0.1151E+00$ |
| FIG. 9E: | $x_5 = m_x$ |
| | $b_{est} = 0.6858E+03$ |
| | $\sigma_{est} = 0.1172E+05$ |
| FIG. 9F: | $x_6 = m_y$ |
| | $b_{est} = 0.2117E+03$ |
| | $\sigma_{est} = 0.8654E+04$ |
| FIG. 9G: | $x_7 = m_z$ |
| | $b_{est} = 0.3172E+03$ |
| | $\sigma_{est} = 0.3991E+04$ |
| FIG. 9H: | $x_8 = f_0$ |
| | $b_{est} = 0.1526E-04$ |
| | $\sigma_{est} = 0.2385E-02$ |

INDUSTRIAL APPLICATIONS

Road Applications: Counting, Classification and Estimating the Speed of Vehicles p The first envisaged application is a motorway traffic analysis application. Conventional vehicle detection and counting functions can be carried out from a single instrumentation site, which is not even necessarily located in or under the road surface, as is often the case in existing systems.

The large amount of information in the estimated state vector x also provides a means of determining the direction and number of the traffic lane, the position and speed of the vehicle in this lane, and finally the nature of the vehicle (motorbike, car, utility, truck).

Gradientmetric measurements may also be used alone for this application, since the fact that vehicles are necessarily located on the road reduces the number of degrees of freedom in the problem. The device must be placed along a straight portion of the motorway, and one of the axes of the cartesian coordinate system, for example y, is chosen along the direction of the motorway. In this case, the dx/dt parameter is always zero and the x parameter is one of N values, where N is the number of traffic lanes.

Figure 10:
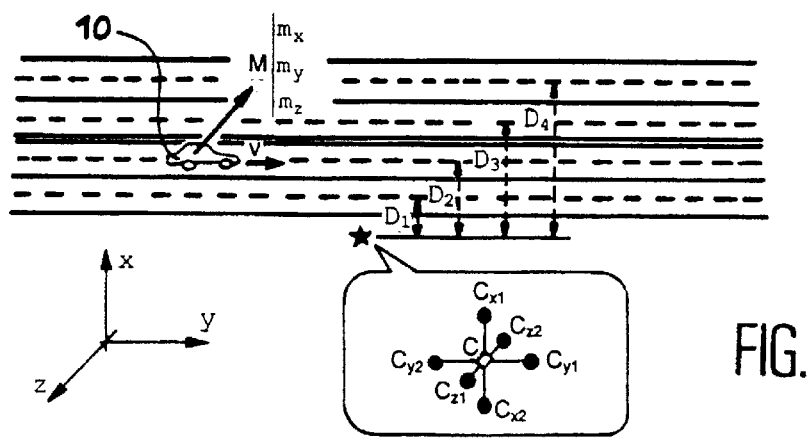
FIG. 10 illustrates the block diagram of a road traffic analysis system based on a single instrumentation site located nearby traffic lanes.

FIG. 10 illustrates a block diagram of the road traffic analysis system based on a single instrumentation site located near the traffic lanes. It is not necessary for the device according to the invention to be placed in the plane of the traffic lanes. In the case shown on this figure, there are four traffic lanes and one vehicle 10.

Application in Submarine Surveillance; Immersed Surveillance Sensor

The invention can be used to envisage surveillance networks with maximum inter-sensor distances, since only one observation site is necessary for tracking.

Submarine sources usually move in a horizontal plane, the depth of which may be assumed to be known or unknown. In shallow water, the assumption by which sources move in the plane of the sensors is commonly accepted since horizontal expanses are much greater than the water depth. Due to their large inertia and lack of obstacles, ships usually move along headings and therefore in a uniform movement along a straight line.

No other degree of freedom of the problem can be eliminated, apart from these assumptions. Therefore, it is recommended that the approach that consists of using scalar gradientmetric measurements should be used with omnidirectional acoustic measurements. These omnidirectional acoustic measurements can make use of the Doppler effect applicable to combs of emission lines emitted by submarine sources.

Figure 11:
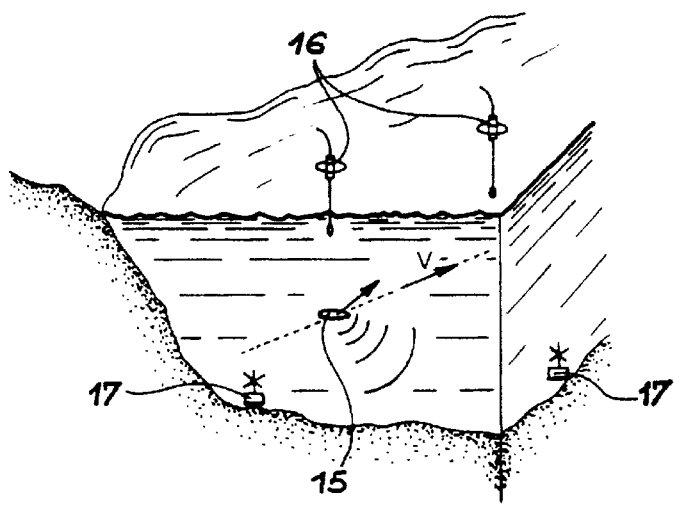
FIG. 11 illustrates a block diagram of a submarine application.

FIG. 11 illustrates a block diagram of a submarine application with a source 15, direction change buoys 16 and observation sites 17 laid on the seabed.

Application in Airborne Submarine Surveillance

In this application, the acquisition device is placed onboard an aircraft or in "birds" towed by the aircraft. Therefore, maneuvers can be made and the cartesian positioning vector defined in equations (7) or (15) can be estimated without phantom solutions.

One approach is to place a sensor 20 at the end of each wing, one at the aircraft tail and one in the towed "bird". Provided that it is known how to position each of these sensors in a coordinate system related to the aircraft, for example by GPS, three directions of the spatial gradient of the magnetic field are available with well adapted base lengths.

The type of maneuver made controls the precision and the existence of local minima during the minimization phase. It is possible to consider clearly defined maneuvers with heading changes as soon as the source is detected, or small displacements of the device, so that a globally constant heading can be maintained while keeping the problem observable.

Figure 12A:
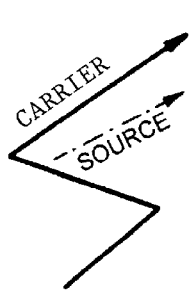
FIGS. 12A to 12C illustrate different types of maneuvers used to make the positioning state vector observable.
Figure 12B:
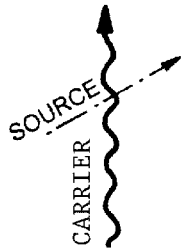
Figure 12C:
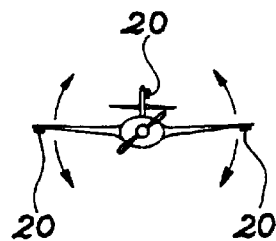

FIG. 12 show different types of maneuvers that make the positioning state vector observable:

FIG. 12A illustrates a clearly defined heading change;

FIG. 12B illustrates a maneuver without a heading change;

FIG. 12C illustrates carrier oscillations starting from detection.

Positioning of a Magnetic Object Due to a Towed Streamer

As in the previous application, the measurement device is moving, so that maneuvers can be made. In this case, sensors can be located on the same streamer and can be separated from it by fins, or they can be placed at the end of different streamers. In all cases, the sensor must be identified with respect to each other, for example using acoustic positioning systems or "pingers".

BIBLIOGRAPHIC REFERENCES

[1] <<Geomagnetisn>> (J. A Jacobs, Academic Press, London 1989)

[2] "Instrumentation and Experimental Methods for Oceanic Studies" by H. H Filloux, (J. A. Jacobs (ed.) Geoelectromagnetism, volume 1, pages 143–248, 1987)

[3]"Dispositif de mesure d'un champ électrique dans un fluide conducteur et procédé utilisant un tel dispositif>> (Measurement device for an electromagnetic field in a conducting fluid and process using such a device) by J. Mosnier (French patent No. 84 19577) (FR 2 575 296-A1), Jun. 27, 1986.

[4] <<The flustage Magnetometer Review)>> from F. Primdahl (J. Phys. E.: Sci Instrum., volume 12, pages 241–253, 1979)

[5] <<Advances Superconducting Gradiometer/Magnetometer Arrays and A Novel Signal Processing Technique>> by W. M. Wynn, C. P Frahm, P. J Carroll, R. H Clark, J. Wellhoner, M. J Wynn (IEEE Trans. On magnetics, volume MAG-11, No. 2, pages 701–707, March 1975

[6]<<(Traitement en temps réel du signal issu d'une sonde magnétométrique pour la détection d'anomalie magnétique>>(Real time processing of a signal output from a magnetometric probe for detection of a magnetic anomaly), by R. Blanpain (I.N.P.G. thesis, October 1979).

[7]<<Detection/localisation d'object ferromagnétique par réseau de capteurs: approche classique et approche neuronale>> (Detection/Positioning of a ferromagnetic object by a sensors network; classical approach and neuronal approach, by Y. Caritu (I.N.P.G. thesis, May 1996).

[8] <<Localisation and positionnement d'un ou plusieurs objets marqués magnétiquement à l'aide de mesures magnétiques directionnelles>> (Location and positioning of one or several magnetically marked objects using directional magnetic measurements) by R. Blanpain, A. Dumont and C. Sonrel (Patent FR-2586302).

[9] <<(Computeized Model Demonstrating Magnetic Submarine Localization>> by A. D. McAulay (IEEE Trans. Aerosp. Electron Syst., pages 246–254, May 1977)

[10] <<The Detection of ULF-ELF Emission of Moving Ships>> by F. X. Bostick, H. W Smith and J. E. Boeh (Final report AD A037 830, Electrical Engineering Research Laboratory, University of Texas, Austin, March 1977, pages 23 to 28

[11] <<Analyse de la propagation électromagnétique en milieu marin & méthode de localisation spatiale d'une source dipolaire>> (Analysis of electromagnetic propagation in a marine environment and method for spatial positioning of a dipolar source) by J. Y. Bruxelle (Thesis at Lille University of Science and Technology, May 1995).

[12] <<A Bayesian Approach to Frequency Line Tracking>> R. E. Bethel and J. A. Gauss (Proc. IEEE EASCON, pages 286–290, 1981)

[13] <<Frequency Line Tracking on A Lofargram: An Efficient Wedding Between Probabilistic Data Association Modelling And Dynamic Programming Techniques>> by C. Jauffret and D. Bouchet (Asilomar Conf., Monterey, USA, 1996)

[14] <<Data Association From Two Acoustic-Magnetic Measurement Sites>> by G. Dassot & R. Blanpain (IEEE Workshop On Digital Processing, Loen, Norge, September 1996)

[15] <<Observability Criteria For Bearings-Only Target Motion Analysis>> by S. C. Nardone & V. J. Aidala (IEEE Trans. Aerosp. Electron Syst., volume AES-17, pages 162–166, March 1981)

What is claimed is:

1. A process for determining the position of a moving object comprising:
    acquiring scalar measurements by a set of sensors capable of movement during said process and adapted to transmit their positions at each of a plurality of instants;
    estimating a trajectory of the object by a model;
    combining the measurements output from each sensor to obtain spatial gradient measurements representative of the vector magnetic disturbance of the moving object;
    estimating a vector of parameters characteristic of the model as a function of gradient measurements and as a function of the position of the sensors; and
    determining the position of the object as a function of the position of the sensors and the parameters vector;
    wherein the sensors are all installed at substantially the same physical location.

2. A process according to claim 1, further comprising modeling the movement of the object based on a uniform movement along a straight line, the parameters vector being ($\theta$, r/v, v'/v), where $\theta$ is the azimuth of the object at a reference instant taken with respect to the North direction, r is the source/sensor distance at the same reference instant, v' is the speed of the object, and v is the modulus of the speed.

3. A process according to claim 1, further comprising using magnetic measurements in combination with acoustic measurements.

4. A process according to claim 1, further comprising using electromagnetic measurements output from scalar magnetometers used in gradientmeters.

5. A process according to claim 1, further comprising estimating the parameters vector using an algorithm that maximizes the probability of the tracking parameters vector or state vector with respect to the probability distribution of measurement noise.

6. A process according to claim 5, further comprising using minimization algorithms to minimize the error between the measured signals and the signals reconstructed with the model used to approximate the trajectory of the object when the measurement noise is approximately gaussian.

7. A process for determining the position of a moving object comprising:
    acquiring scalar measurements by a set of sensors capable of movement during said process and adapted to transmit their positions at each of a plurality of instants;
    estimating a trajectory of the object by a model;
    combining the measurements output from each sensor to obtain spatial gradient measurements representative of the vector magnetic disturbance of the moving object;
    estimating a vector of parameters characteristic of the model as a function of gradient measurements and as a function of the position of the sensors; and
    determining the position of the object as a function of the position of the sensors and the parameters vector;
    wherein the sensors are all installed at substantially the same physical location; and
    further comprising using together an azimuth method and a Doppler phenomenon observed in the case of sources radiating a narrow band signal around a stable central frequency.

8. A process according to claim 5, wherein at least one sensor is moved during said process.

9. A process according to claim 1, wherein the speed of vehicles is counted, classified and estimated.

10. A process according to claim 1, wherein said process is used for submarine surveillance.

11. A process according to claim 7, further comprising modeling the movement of the object based on a uniform movement along a straight line, the parameters vector being ($\theta$, r/v, v'/v), where $\theta$ is the azimuth of the object at a reference instant taken with respect to the North direction, r is the source/sensor distance at the same reference instant, v' is the speed of the object, and v is the modulus of the speed.

12. A process according to claim 7, further comprising using magnetic measurements in combination with acoustic measurements.

13. A process according to claim 7, further comprising using electromagnetic measurements output from scalar magnetometers used in gradientmeters.

14. A process according to claim 7, further comprising estimating the parameters vector using an algorithm that maximizes the probability of the tracking parameters vector or state vector with respect to the probability distribution of measurement noise.

15. A process according to claim 14, further comprising using minimization algorithms to minimize the error between the measured signals and the signals reconstructed with the model used to approximate the trajectory of the object when the measurement noise is approximately gaussian.

16. A process according to claim 14, wherein at least one sensor is moved during said process.

17. A process according to claim 7, wherein the speed of vehicles is counted, classified and estimated.

18. A process according to claim 7, wherein said process is used for submarine surveillance.

* * * * *